United States Patent [19]
Johansen et al.

[11] 3,930,113
[45] Dec. 30, 1975

[54] HIGH VOLTAGE OVERHEAD TRANSMISSION LINE CONDUCTOR WITH REDUCED WET WEATHER CORONA NOISE AND CORONA LOSSES

[75] Inventors: Inge Johansen, Heimdal, Norway; David W. Tong, Cambridge, Mass.

[73] Assignee: Massachusetts Institute of Technology, Cambridge, Mass.

[22] Filed: June 10, 1974

[21] Appl. No.: 477,560

[52] U.S. Cl. ............... 174/40 R; 174/9 R; 174/127; 174/130
[51] Int. Cl.² ...................... H02G 7/00; H01B 5/00
[58] Field of Search .......... 174/9 R, 14 R, 24, 25 R, 174/40 R, 43, 70 R, 70 A, 124 R, 124 G, 126 R, 126 CS, 127, 128, 129 R, 130, 131 R, 131 A, 131 B

[56] References Cited
UNITED STATES PATENTS

| | | | |
|---|---|---|---|
| 1,626,777 | 5/1927 | Austin | 174/127 |
| 1,749,008 | 3/1930 | Walker | 174/14 R UX |
| 1,984,553 | 12/1934 | Staples | 174/131 R |
| 1,999,273 | 4/1935 | Austin | 174/128 |
| 2,075,996 | 4/1937 | Noyes | 174/128 UX |
| 3,286,019 | 11/1966 | McLoughlin et al. | 174/127 X |
| 3,641,251 | 2/1972 | Liao | 174/40 R |
| 3,749,813 | 7/1973 | Shealy | 174/127 X |
| 3,801,726 | 4/1974 | Kurihara et al. | 174/40 R |
| 3,825,671 | 7/1974 | Pokorny | 174/40 R |

Primary Examiner—Laramie E. Askin
Attorney, Agent, or Firm—Arthur A. Smith, Jr.; Robert Shaw; Martin M. Santa

[57] ABSTRACT

An electrical conductor having the ability to absorb and store water appearing on the surface and to remove the stored water by transporting it to an expulsion site. This is achieved in one embodiment by supplying a central conductor with a porous, absorbent and electrically conducting outer layer. Similar results obtain when the strands of a multi-strand conductor are provided with azimuthal threads or grooves of a certain fineness and an additional electrochemical or chemical treatment of the surface for improved wettability.

23 Claims, 13 Drawing Figures

HIGH VOLTAGE OVERHEAD TRANSMISSION LINE CONDUCTOR WITH REDUCED WET WEATHER CORONA NOISE AND CORONA LOSSES

The present invention relates to high-voltage overhead transmission lines and the like, and, more particularly, to high-voltage transmission lines and the like to reduce the corona-generated noise during fog, light rain, and following heavy rain.

With the advent of high-voltage and particularly ultra-high voltage transmission lines that now reach the 750 kv level, power companies have begun to experience serious customer complaints of audible noise in the vicinity of high voltage lines due to corono on the conductors. The audible-noise problem is particularly troublesome during conditions of fog, light rain, and subsequent to heavy rain. The problem arises when the voltage gradient at the conductor surface reaches 75 to 80% of the dry corono threshold. A direct cure for the problem would be to lower the surface gradient to 60 to 70% of dry corona threshold, but this involves the use of larger conductors and hence increased cost of construction. For the system voltages higher than 765 kV the audible noise problem is regarded as one of the main unsolved problems.

So far, power companies have relied mainly on the gradient reduction method when dealing with audible noise complaints. Various methods have been tried which were mainly variations of the gradient reduction method. The improvements found have been minimal and show at best a few decibels in noise reduction. See, for example, a journal article in IEEE Transaction on Power Apparatus and Systems, Volume PAS-92, No. 5, pages 1782–89, entitled "Audible-Noise Reduction by Bundle Geometry Optimization" (Comber et al.); and an accompanying paper entitled "The Reduction of Audible Corona Discharges on A.C. Transmission Lines" (Daniel et al.). Also, an "ultra-corona" method of shielding droplets has been proposed, see, for example, accompanying report by M. A. Lecat, entitled "Problème de la réduction du bruit acoustique engendré par l'effet couronne des lignes aeriénnes haute tension." A disadvantage of the approach described in the last proposal is power loss due to corona, even in fair weather.

Accordingly, an object of the present invention is to provide a conductor for high-voltage transmission lines and the like adapted to ameliorate said audible-noise problem during such conditions and to reduce corona losses, radio interference and television interference.

Further objects are apparent hereinafter.

The objects are achieved by an electrical conductor composed of many intertwined strands and wherein means is provided to convey any moisture found at the outer surface of the conductor to the interior thereof. The moisture once it reaches the interior is conveyed to an expulsion site where it is removed from the conductor under conditions of reduced electric field. In its preferred form the conductor strands are circular in cross section and each has circumferential grooves (as used here the term "grooves" embraces such things as threads, serrations and the like, that are formed at the surface of each strand and cover the whole of the surface) that are narrow enough and deep enough to effect capillary action, the groove width being such that it does not enhance voltage gradients and shallow enough to prevent mechanical strains on the strand. Thus, any drops of moisture that form at the outer surface of the conductor are removed by the capillary action of the grooves circumferentially around each strand to the longitudinally extending spaces between strands at the interior, whence such drops flow by gravity in a free flowing stream toward a low electric field explusion site where they are removed from the conductor, by siphoning action using a wick that draws the moisture from the interior of the conductor. The wick is electrically shielded so that the moisture drawn from the interior of the conductor is not exposed to high fields but is rather expelled under a condition wherein the field is reduced.

The invention is hereinafter explained with reference to the accompanying drawing in which.

The work leading to the present invention has been done and continues at the Electric Power Systems Engineering Laboratory of the Massachusetts Institute of Technology. As a result of that work, the inventors now have a fairly clear picture of the noise producing mechanism with respect to high-voltage transmission lines in the presence of moisture. During periods of foul weather, water drops collect on the surface of an electrical conductor. These drops deform under high electric stress, each drop developing a sharp point (see the drop labeled 20 in FIG. 9A) or points from which noisy corona pulses occur.

The principle behind this invention is to remove the water drops from the highly stressed surface of the conductor to the interior thereof and, when necessary, to transport the fluid within the field-free interior of the cable to certain expulsion sites. Ideally, by removing the water drops as field intensifying agents, there will also be no attendant corona below the dry corona threshold.

Figure 1:
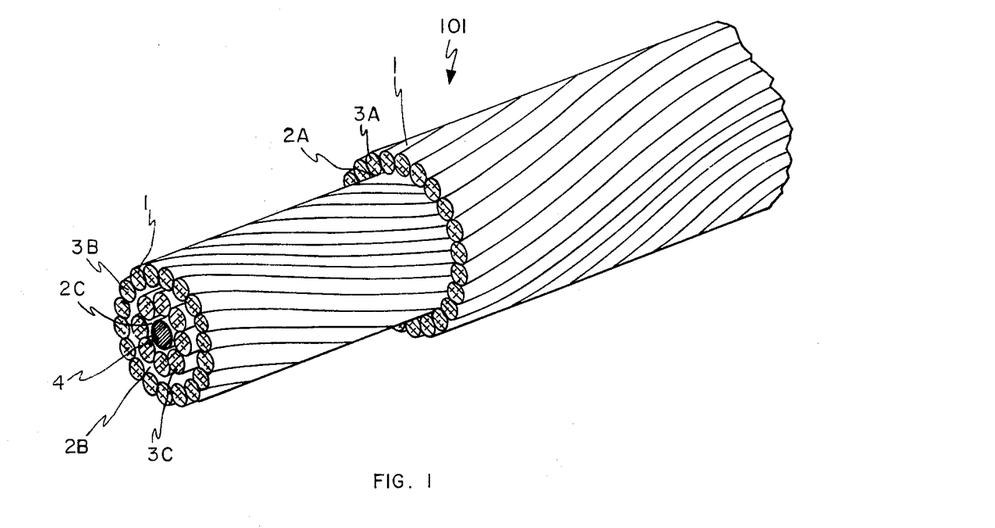
FIG. 1 is a perspective view, partly cutaway, showing a preferred embodiment of an electrical conductor embodying the present inventive concepts, said conductor being composed of many strands disposed in multiple layers, the strands each having circumferential grooves or serrations and there being longitudinal spaces or channels between strands inside the conductor.
Figure 2:
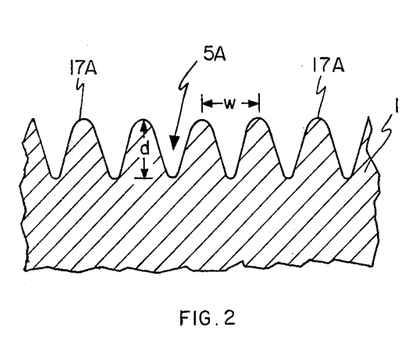
FIG. 2 is a longitudinal sectional view, greatly enlarged, of a small length of one strand of the conductor in FIG. 1, and is intended to show in detail the grooves at the periphery of each strand.
Figure 3:
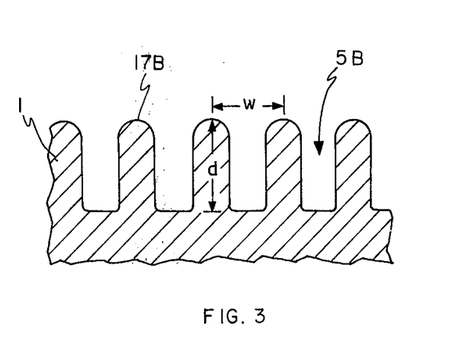
FIG. 3 shows, a modification of the grooves in FIG. 2.

The preferred form of electrical conductor that has evolved from said work is that shown at 101 in FIG. 1. The conductor 101 is intended to be any one of the three conductors shown in the system of FIG. 5, which can be a high voltage or a ultra-high voltage system. The conductor 101 is composed of many strands 1 formed in multiple layers 3A, 3B, 3C, etc., the layer 3A being the outer layer and being very important for present purposes. (The central or axial strand or strands labeled 4, can be steel for strength while the other strands, as is usual for conductors of this nature, can be aluminum). Each of the strands 1, as shown in the expanded views of FIGS. 2 and 3, is grooved, as shown at 5A and 5B, respectively. The transverse grooves 5A and 5B must have widths w small enoughg for capillary action to occur (ie., to render the strands 1 water absorbent) and each strand 1 is anodized or otherwise electrochemically or chemically treated so that capillary action does not occur with respect to water droplets at the outer surface of the conductor 101.

The grooves 5A and 5B are formed circumferentially around each strand 1; that is, each groove is formed at the periphery of the strand and the plane of the groove is substantially orthogonal to the axis of the conductor 101. Thus, any drops of moisture that form at the outer surface of the layer 3A are removed by capillary action of the grooves circumferentially around each strand 1 of the layer 3A to the longitudinally spaces designated 2A between the strands 1 of the layer 3A and those of the layer 3B. The longitudinally extending spaces 2A form unrestricted channels through which water can flow as a free-flowing stream from a collection site to an expulsion site, as later explained, in those situations wherein sufficient moisture enters the conductor 101 to require or, more accurately, to permit a stream to form. On the basis of the foregoing explanation, it can now be seen that serrations or grooves at the periphery of the strands 1 in the layer 3B will draw water radially into the longitudinal channels shown at 2B, etc., to the channels at the center of the conductor 101. For most effective results, the strands in the interior of the conductor 101, except the strand 4 at the axis thereof, should be grooved, but the strands of the outer layer 3A must be grooved to render them moisture absobent. The strands 1 are, of course, conductive and therefore form an electrical shield with respect to water disposed in the interior of the conductor 101. To be effective as a shield, the outer surface of the conductor 101 must have a conductivity at least of the order of $10^{-7}$ mhos per meter. The term "outer surface" as used herein defines the actual exposed surface in the case of copper, for example, and is intended to exclude the oxide layer as in the case of aluminum. The need for electrical shielding precludes the use of an insulating cover on the conductor 101 other than a thin oxide layer (i.e., ~10 microns or less). Said another way, the outer surface, if insulating at all, must be thin enough so that the conducting part of the conductor underneath acts to shield water inside the conductor 101; and as to the grooved conductor of FIGS. 2 and 3, it is the conductivity of and near peaks 17A and 17B that is important.

In conditions of light fog and short rains, the absorption capacity of the conductor 101 combined with evaporation will suffice to prevent saturation, but, when that situation is exceeded, it is necessary to dispose of the water that collects in the channels 2A, 2B . . . Disposal is effected at one or more expulsion sites along the conductor at which are located spouts 5 in FIG. 5. The spouts serve to withdraw water from the interior of the conductor 101 and expel it to the environment, as now explained with reference to FIG. 4.

Figure 4:
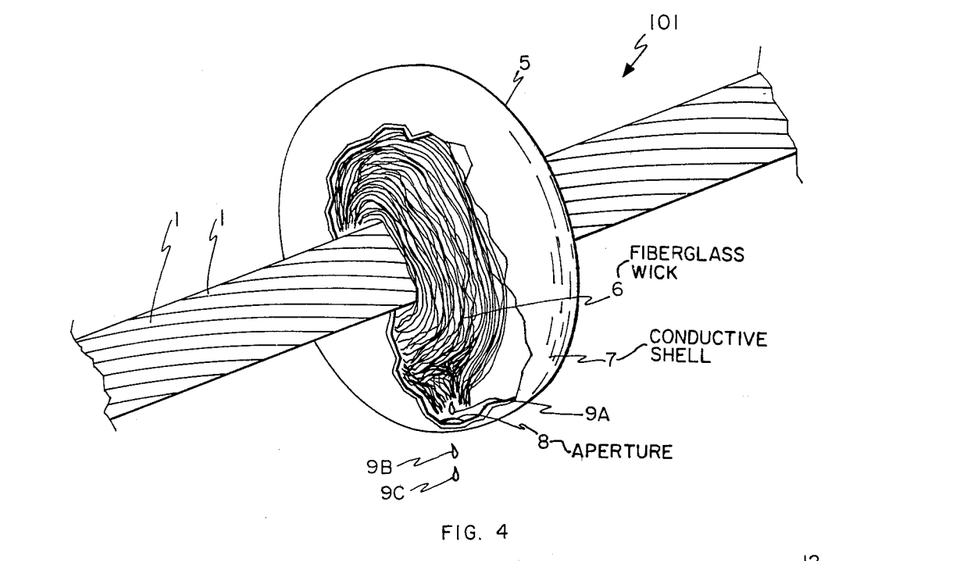
FIG. 4 is a isometric view of an electrical conductor, like that in FIG. 1, and showing a spout, partly cutaway, which is adapted to expel moisture that adheres to the conductor during rain, fog, and the like and is drawn into the interior channels wherein free flow brings it to the region of the spout.

The spout 5 is shown in FIG. 4 to comprise a conductive shell 7 that electrically shields a wick 6 composed of fiberglass or other wicking material that is wound about in intimate contact with the conductor 101, as shown. At the expulsion site, the reverse process of that which occurs at the collection site occurs: water in the channels 2A, 2B . . . is withdrawn by capillary action into the wick 6 whence it travels downward by gravity to emit as drops 9A, 9B, etc., through an aperture 8 at the bottom of the spout. The drop 9A, like the wick 6, is shielded from the high fields and gradients of the system. The drops 9B and 9C are subject to fields and gradients in an operating system, but the shell 7 is made large enough to keep such fields to a low magnitude. The shell in FIG. 4 is shown as a unitary device, but, in practice, it will be made in two halves that are clamped together to form an annulus to receive the conductor. The outside surface of the shell is shaped to minimize high field regions and is sized similarly to keep such fields to acceptable levels. A plurality of spouts 5 can be employed, but at least one should be located at mid-span. Water thus flows downwardly from a collection site freely to the explusion site. Again, the strands in the inner layers 3B, . . . at both the collection site and the expulsion site need not be grooved, but to make use of the channels 2B . . . , such transverse (i.e., grooves with an azimuthal component but one that need not be constant) grooving is required, unless, of course, internal wicking, as later discussed, is used. In a short length of conductor made and tested, the strands 1 are one-fourth inch in diameter and the grooves are in the form of threads, 80 threads to an inch. The $d$ dimension in FIGS. 2 and 3 needs to be deep enough to give the necessary capillary action but should not be so deep that it affects mechanical strength of the strands.

Figure 6:
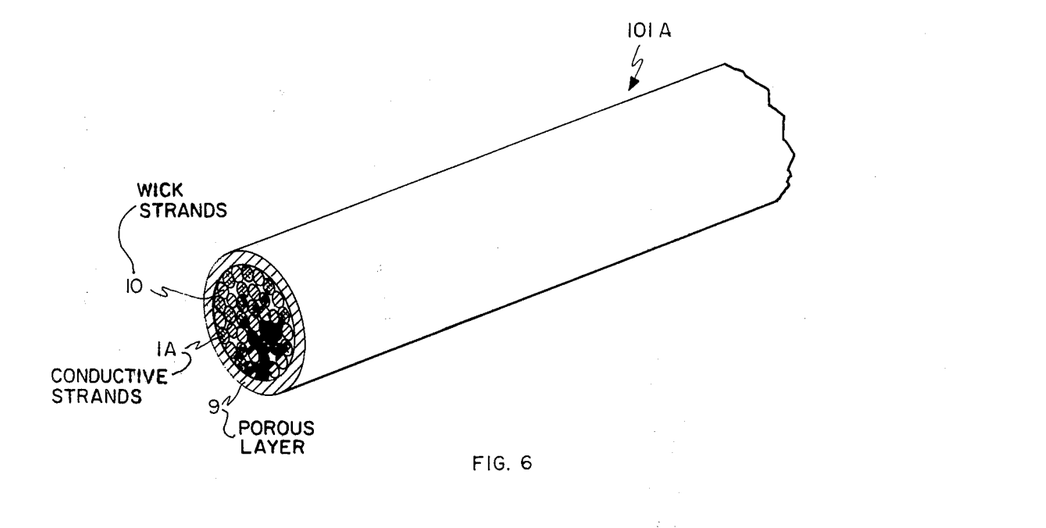
FIG. 6 is an isometric view of a modification of the conductor of FIG. 1.

Another form of conductor is shown at 101A in FIG. 6 comprising a porous, smooth, outer layer 9 that, again, draws water drops into the interior of the conductor, whence they can be transported to a drain site. For a layer 9 of thickness greater than ~10 microns the electrical conductivity of the layer must be greater than $10^{-7}$ mhos per meter in order to shield the absorbed moisture from the intense electric field found in high voltage systems. The interior of the conductor 101A is composed of conductive strands 1A and absorbent material (e.g., fiberglass) strands 10. Each layer of the interior contains both strands 1A and strands 10 (i.e., a strand 1A is usually immediately adjacent a water absorbent strand 10) so that water passes which through the outer layer 9 is absorbed by strands 10 in physical contact with the outer layer. The strands 1A and 10 can be interwoven and layered similar to the interweaving and layering of the conductor 101, each layer thus containing both types strands. And, of course, a combination of the elements in FIGS. 1 and 6 can be employed.

For some of the tests later discussed the conductor had an outer layer of sintered steel, but a better layer 9 is one composed of sprayed aluminum particles (e.g., ~20 micron particles). After the particles are applied, the surface is treated by heating in water and/or anodizing to form a wetting hydrated aluminum oxide layer. Glass fibers have an anisotropic permeability for water in that they convey water faster in the axial direction than in the radial direction, thus making such fibers quite useful for present purposes. Also, it should be appreciated that the conductor 101A has substantial storage capacity which reduces, under many circumstances, the amount of water transported to explusion sites. The presence of fiberglass has the drawback of reducing the axial flow of water from that which obtains when the conductor 101 is employed.

Figure 5:
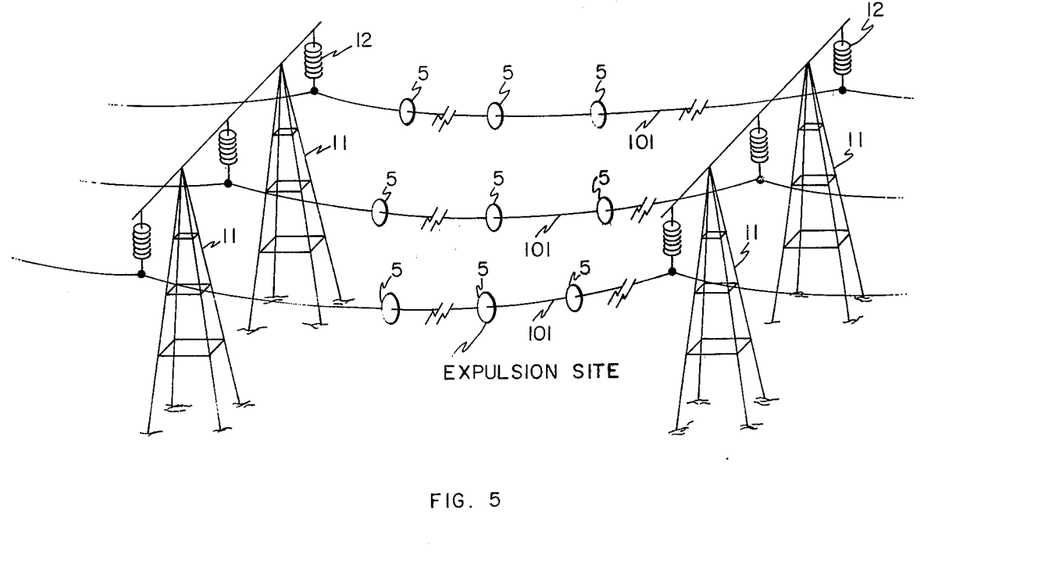
FIG. 5 is a view of a part of a high-voltage transmission line having conductors like that in FIG. 1 and with a plurality of expulsion spouts along each conductor.
Figure 9A:
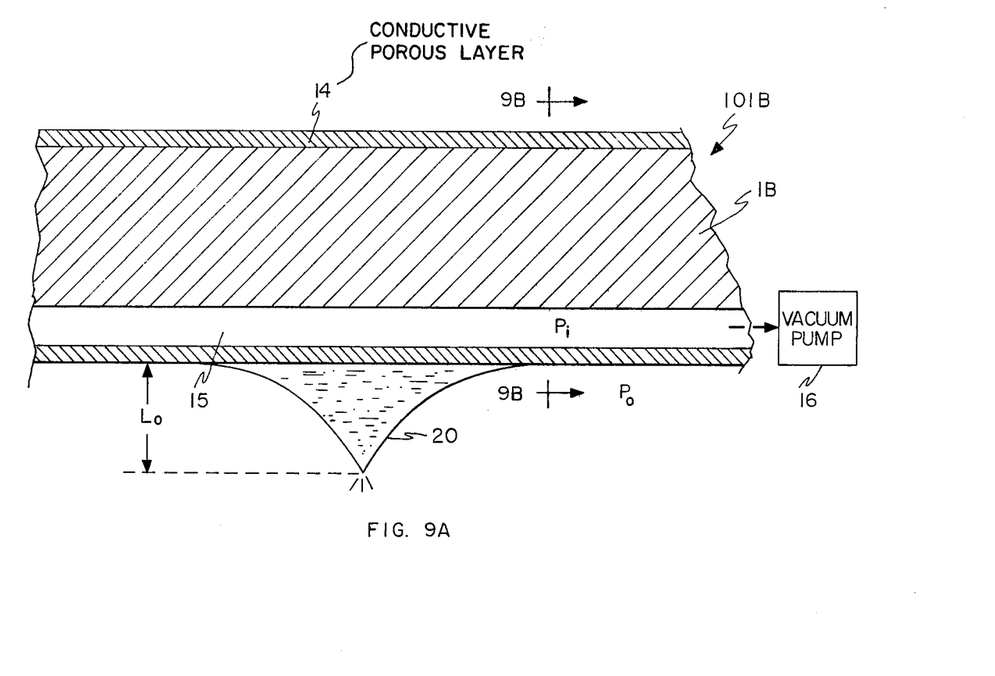
FIG. 9A is a longitudinal sectional view, partly schematic in form, of a modification of the electrical conductor of FIG. 1.
Figure 9B:
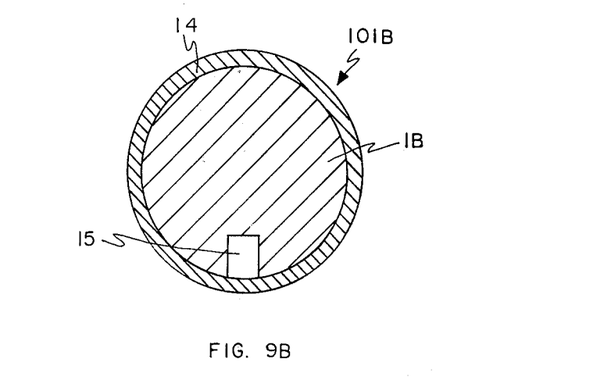
FIG. 9B is a sectional view, reduced in scale, taken upon the line 9B—9B in FIG. 9A, looking in the direction of the arrows.
Figure 10:
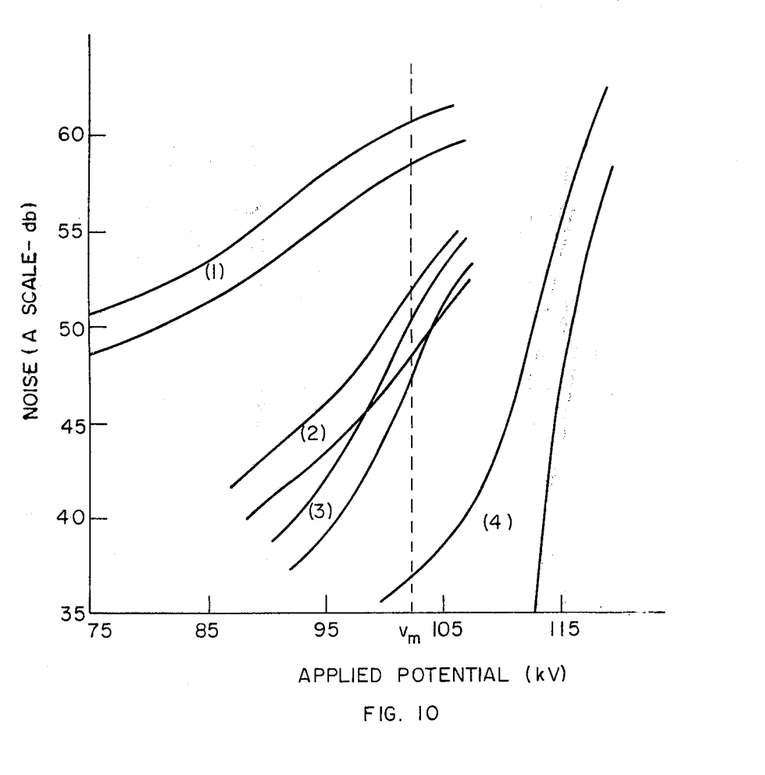
FIG. 10 shows noise-level test results for a conductor similar to that represented in FIGS. 9A–9B, under various weather conditions.

The transmission-line system shown in FIG. 5 comprising the conductors 101 (or 101A) strung from towers 11 by insulator strings 12, is a passive one in that removal of moisture from the conductor 101 is by capillary action and/or gravity (with some evaporation). The conductor shown at 101B in FIGS. 9A and 9B contemplates an active system in that water drops are drawn from the outer surface of the conductor, through an electrically conductive porous layer 14 to a channel 15 in an electrically conductive member 1B. The channel 15 is subjected to a slight vacuum by a vacuum pump 16. The vacuum required need not be more than a fraction of an atmosphere. The water drop 20 is drawn into the channel 15 under the influence of the vacuum, whence it can flow by gravity to one or more expulsion sites, as previously discussed, to be drained through a shielded spout, as before. The pressure differential $\Delta P$ acting in the drop 20 is found in the expression $$\Delta P = P_o - P_i = \rho g L_o,$$

wherein $\rho$ is the density of water, $P_o$ and $P_i$ are respectively atmospheric pressures and the vacuum pressure within the channel 15, $g$ represents the force of gravity, and $L_o$ is the drop dimension from the outside surface of the layer to the lowest point of the drop, as shown in FIG. 9A. The vacuum pump 16 can be a centrifugal blower powered by a high-speed electric motor. Electric energy for the motor can be derived by induced currents within the conductors of a multi-conductor bundle. The pump 16 must be electrically isolated from ground in any event. Noise level test results for a conductor similar to that represented in FIGS. 9A and 9B are shown in FIG. 10 wherein the curves labeled (1), (2), (3) and (4) represent noise levels respectively for conditions of saturating rain, fogging (without heating), fogging (with heating) and fair (dry) weather.

Generation of heat increases the evaporation rate and effectively increases the storage capability of a porous conductor such as the conductor 101A, for example, thereby raising the possibility of eliminating the need for or reducing the number of explusion spouts needed in a system. After a saturating rain, however, any reasonable amount of heating is not likely to affect the corona generation. It appears that heating can be usefully combined with the porous conductor approach only in cold climates where icing occurs frequently. However, the use of heating of conventional conductors has not been closely investigated and cannot as yet be ruled out. In any case, feasible heating scheme must be controllable and may be difficult to implement considering the power required and the high voltage environment.

In support of the foregoing discussion, the inventors carried out some testing of porous conductors. The first conductor tested was constructed by wrapping fiberglass tape over a perforated brass tube. A cooper wire (0.012 inch dia.) winding on the outside served as a shield. The noise performance of this conductor is shown in FIG. 10. Implicit in the measurement is the equivalence of a smooth conductor and a saturated porous conductor with pendant drops, and the equivalence of the vacuum suction case with the unsaturated case. Although the noise improvement in fog was high, a significant noise rise occurred after fogging was stopped. Subsequently, it was discovered that the cause was the formation of minute droplets with diameters about that of the wire.

Figure 7A:
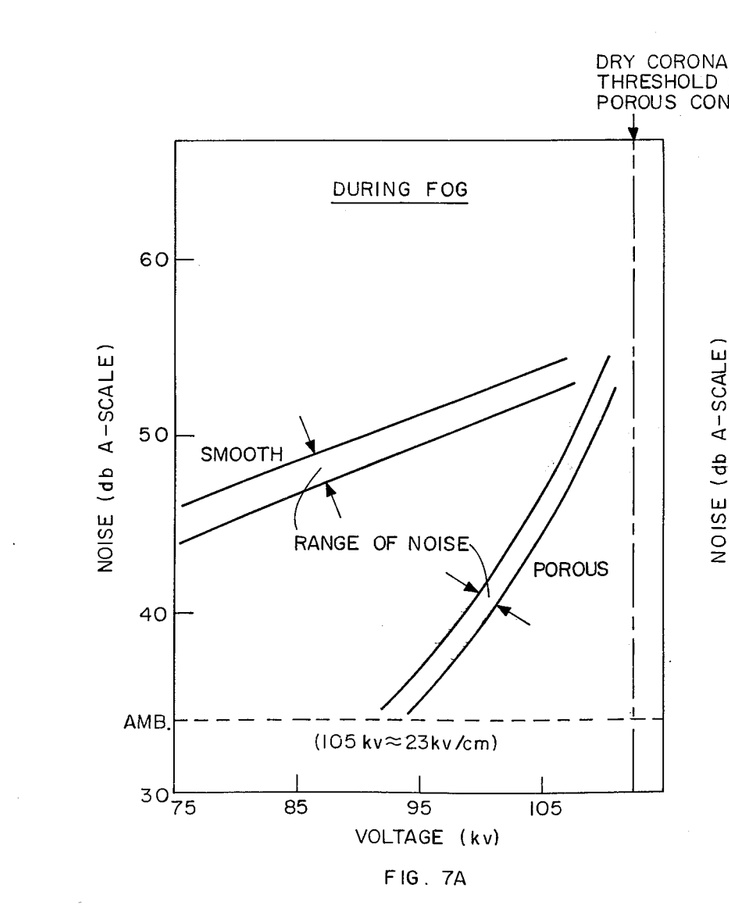
FIG. 7A is a graph of actual measured noise levels during fog conditions for a conductor that simulates the conductor structure herein described, the actual model tested consisting of a sintered stainless steel tube three-fourth inch in outer diameter having average size pores of 10 microns, the interior of the tube being filled with fiberglass to perform a wicking function.
Figure 7B:
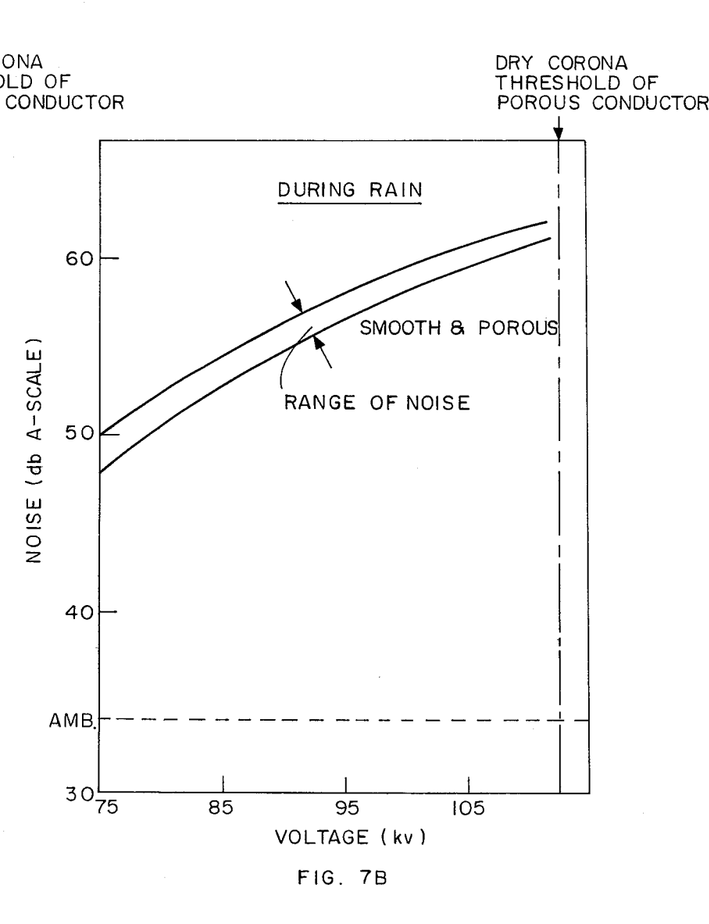
FIG. 7B shows noise-level test results on the same conductor as represented in FIG. 7A, but during rain conditions.
Figure 8A:
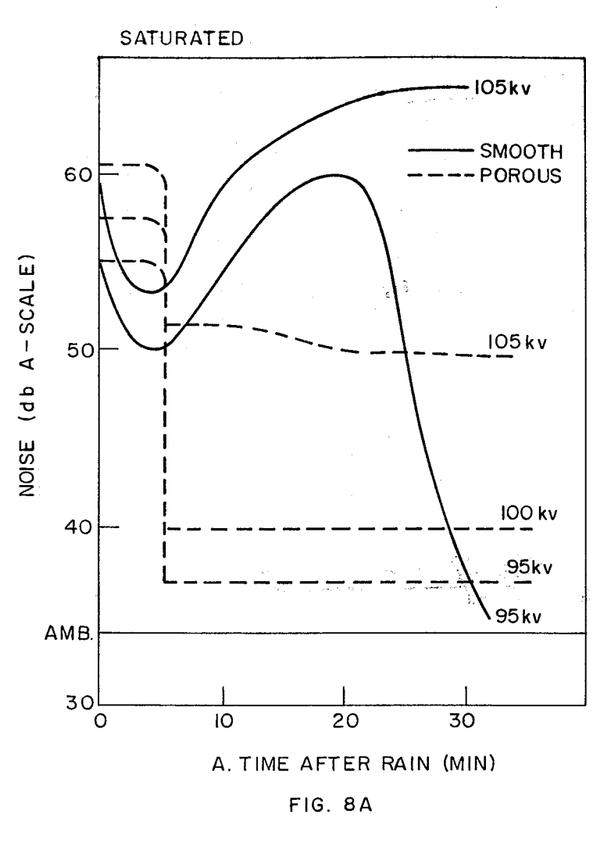
FIG. 8A shows noise-level test results for the conductor represented in FIG. 7A following a fog, in terms of the time lapse.
Figure 8B:
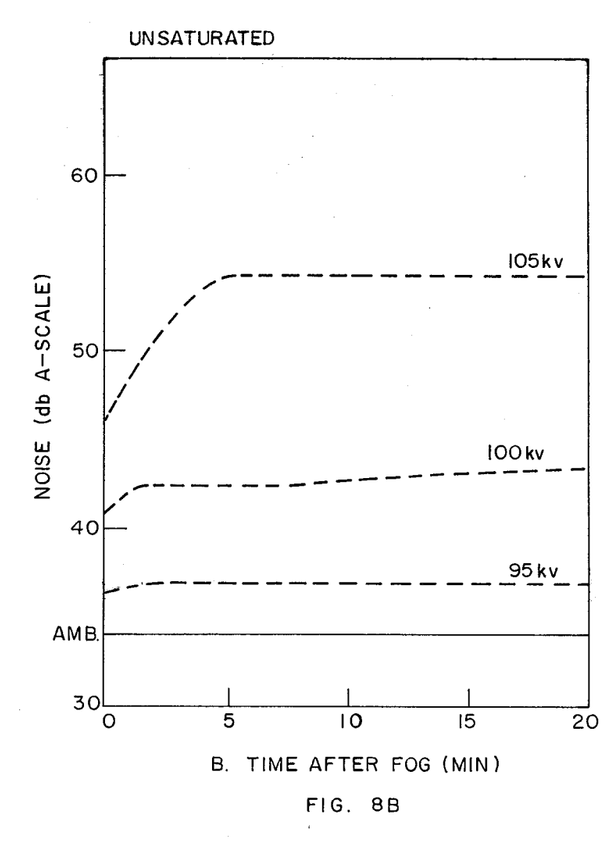
FIG. 8B shows noise-level test results for the conductor represented in FIG. 8A following a rain, in terms of time lapse.

With the intention of reducing the surface droplet size 1 the next test structure was a sintered metal pipe made of stainless steel powder and having an average surface pore size of 10 microns. This powder conductor structure was compared, under like weather conditions, with a smooth, wetting brass pipe of the same size. The results are shown in FIGS. 7A, 7B, 8A, and 8B. FIGS. 7A and 7B show about the same noise improvement during fog as shown in FIG. 10. The lack of improvement during rain lends support to the notion that the presence of normal size water drops on the conductor surface always leads to corona noise. FIG. 8A compares after-rain noise level between the powder-metal conductor and the smooth wetting brass pipe. For the tests represented in FIG. 8A, a wick was inserted in the porous layer. The sharp reduction in noise 5 minutes after stopping rain signifies the point where all pendent drops have been removed via the wick. For the smooth conductor, the initial dip in noise is explained by the fact that splashing is no longer present. The subsequent rise in noise in this case is strongly indicative of an optimal drop size for corona noise generation which is less than the maximum drop size that a perfectly wetting surface can support. FIG. 8B shows the after-fog noise level for the powder metal conductor. The rise in noise for the 105 kV case is attributed to corona from fine fibers adhering to the conductor due to mishandling.

Other type conductors can be employed and other materials. Possibilities include doped fiberglass, conductive oxide layers, metal fiber cloth and powder metal, the latter being sprayed on, as above noted in connection with aluminum. As to such powder metal, recent developments appear promising for a conductor having inner multi-conductive strands and an outer conductive layer of sprayed aluminum powder, such outer surface absorbs water like a blotter.

Still further modifications of the invention herein described will occur to persons skilled in the art and all such modifications are deemed to be within the spirit and scope of the invention as defined by the appended claims.

What is claimed is:

1. An electrical conductor for use in very high voltage or ultra-high voltage systems, that comprises: a plurality of conductive strands bound together in a plurality of layers, the outer surface of the conductor being moisture absorbent so that moisture is drawn by capillary action from said outer surface and toward the longitudinal axis of the conductor.

2. An electrical conductor as claimed in claim 1 in which each said strand contains at the outer surface thereof a plurality of grooves having widths small enough so that capillary action occurs at said outer surface, thereby rendering said outer surface water absorbent, and the dry corona threshold is not greatly affected.

3. An electrical conductor is claimed in claim 2 in which the grooves are disposed at an angle to the axis of the strand and in which the surface of the strand is treated to enhance wettability.

4. An electrical conductor as claimed in claim 3 having spout means to expel moisture from the conductor and having means to transport moisture longitudinally along the conductor from the region at which it enters the interior of the conductor to the expulsion site.

5. An electrical conductor as claimed in claim 4 in which the means to transport moisture comprises the substantially open channels that appear in the interior of the conductor between the strands thereof and in which the spout means comprises wick means in intimate contact with the conductor at the explusion site to remove the moisture from the interior of the conductor, the wick being pendent from the conductor so that the moisture is drawn by gravity and falls as drops from the lower end of the wick.

6. An electrical conductor as claimed in claim 4 in which the spout means comprises a fairly large conductive shell that surrounds and electrically shields the region of physical contact between the wick and the conductor at the expulsion site, an aperture being provided at the lower part of the shell to permit the water drops to pass through.

7. An electrical conductor as claimed in claim 6 in which the wick is a glass fiber wick wound tightly around the conductor at the explusion site and in intimate contact with the grooves at the outer surface of the strands to draw moisture from the grooves at the outer surface and hence from the interior of the conductor.

8. A conductor comprising several intertwined strands in which each strand is supplied with individual grooves and given a chemical treatment to provide a wetting surface, said grooves acting as capillaries to convey moisture from the surface of the conductor to the interior thereof.

9. A conductor as claimed under 8 in which some of the strands comprise an absorbing material.

10. A conductor as claimed under 8 having a drain spout and in which the free spaces between the strands act as transport channels toward the spout.

11. An electrical conductor for use in a very high voltage or an ultra-high voltage system that comprises: a plurality of conductive strands bound together, the outer surface of the conductor having a conductivity of at least the order of $10^{-7}$ mhos per meter and said outer surface being moisture-absorbent so that moisture is drawn by capillary action from said outer surface and toward the longitudinal axis of the conductor.

12. An electrical conductor as claimed in claim 11 in which the whole of the outer surface of said strands contains transverse grooves having widths small enough so that capillary action occurs at said outer surface.

13. An electrical conductor as claimed in claim 11 in which the conductor comprises a plurality of layers of said strands, the strands having transverse grooves over the whole periphery thereof, the grooves being small enough to provide capillary action with respect to water drops in contact with said periphery.

14. An electrical conductor for use as an overhead transmission line in a very-high voltage or an ultra-high voltage system, that comprises, an electrical conductor having disposed on its surface a layer of water-absorbent material that effects transport by capillary action of any water at said surface toward the longitudinal axis of the conductor, and means electrically shielding the water absorbent layer.

15. A very high voltage or ultra-high voltage overhead transmission line system that comprises: a plurality of electrical towers, a plurality of electrical conductors, and insulation means mechanically connecting each electrical conductor to each tower and electrically insulating each conductor from each tower, each electrical conductor comprising conductive means and means for removing moisture from the outer surface of the electrical conductor and toward the axis of the electrical conductor, the last named means comprising means to effect transport of the moisture from said outer surface and toward said axis by capillary action.

16. An electrical conductor for overhead transmission lines for systems of at least 138 kV, that comprises: a central electrical conductor, an electrically conductive, water absorbent layer disposed upon the surface of the central conductor, and longitudinally extending water-transport channel means inside the layer, said water absorbent layer acting through capillary action to absorb water at said surface and to transport the water, thus absorbed, to said channel means.

17. An electrical conductor as claimed in claim 16 that includes means for creating a slight vacuum within the channel means.

18. An electrical conductor as claimed in claim 17 that includes at least one moisture-drainage spout for each span of the transmission line.

19. An electrical conductor for overhead transmission lines for systems of at least 138 kV, that comprises: an inner electrical conductor, and electrically conductive, porous layer means disposed upon the surface of the inner conductor, said porous layer means acting to remove water from said surface during foul weather, to draw the water by capillary action inside the electrically conductive porous layer means, and to effect electrical shielding of the water within said porous layer means.

20. An electrical conductor as claimed in claim 19 in which the conductivity is at least the order of $10^{-7}$ mhos per meter at the outer surface of the porous layer.

21. A composite electrical conductor for overhead transmission lines for 138 kV and above that comprises: inner electrically conductive means; water-absorbent means associated with the conductive means; and an electrically conductive, porous layer at the outer surface of the electrical conductor, said water-absorbent means acting to draw water from said outer surface into the interior of the water-absorbent means, where the water is stored, and acting as well to remove the same to a point of drainage.

22. A method of reducing corona discharge from outdoor high voltage conductors of a transmission line during conditions of rain and fog, that comprises, drawing water drops that form on the outer surface of each conductor of the transmission line from said outer surface toward the interior of the conductor, transporting the water longitudinally within the conductor to a drainage site, and draining the water from the conductor under conditions of reduced electric field.

23. A conductor comprising several intertwined strands in which each strand is supplied with individual grooves and given an electrochemical treatment to provide a wetting surface, said grooves acting as capillaries to convey moisture from the surface of the conductor to the interior thereof.

* * * * *